Aug. 1, 1961   R. D. CONKWRIGHT ET AL   2,994,740
REMOTE CARD SELECTING AND VIEWING APPARATUS
Filed Feb. 11, 1959   6 Sheets-Sheet 1

Fig-1

INVENTOR.
ROBERT D. CONKWRIGHT
WARREN D. NOVAK
BY
ATTORNEY.

INVENTOR.
ROBERT D. CONKWRIGHT
WARREN D. NOVAK

BY

ATTORNEY.

INVENTOR.
ROBERT D. CONKWRIGHT
WARREN D. NOVAK

ATTORNEY.

INVENTOR.
ROBERT D. CONKWRIGHT
WARREN D. NOVAK

ORIFICE HEIGHT,
NEUTRAL POSITION—
TAB HEIGHT—
CARD HEIGHT—

*INVENTOR.*
ROBERT D. CONKWRIGHT
WARREN D. NOVAK
BY

ATTORNEY.

Aug. 1, 1961  R. D. CONKWRIGHT ET AL  2,994,740
REMOTE CARD SELECTING AND VIEWING APPARATUS
Filed Feb. 11, 1959  6 Sheets-Sheet 6

INVENTOR.
ROBERT D. CONKWRIGHT
WARREN D. NOVAK
BY
ATTORNEY

United States Patent Office 2,994,740
Patented Aug. 1, 1961

2,994,740
REMOTE CARD SELECTING AND VIEWING APPARATUS
Robert D. Conkwright, Bronxville, and Warren D. Novak, Chappaqua, N.Y., assignors to General Precision Inc., a corporation of Delaware
Filed Feb. 11, 1959, Ser. No. 792,491
15 Claims. (Cl. 178—6)

This invention relates to apparatus for selecting and viewing file cards from a remote point.

The world has a great store of information covering a vast number of different fields of knowledge. There is so much information stored in so many places that it is difficult for a worker to locate the precise information he requires for the job at hand. One widely used device to assist the worker in his search is the familiar file card which is found in libraries, government departments, business offices, schools, banks, newspaper offices and other places. Some file cards, such as those used in libraries, are primarily indexes to other sources of information while other cards, such as those used by banks to record depositors' signatures, themselves contain the desired information.

As a file of cards is built up, the cards themselves and their containers become bulky and cannot be transported conveniently from place to place. Therefore, it is usually necessary for each person who wishes to use the file to go to its location to do so. A file could be utilized far more effectively if it were possible for persons at remote locations to view the file.

The kind of information stored and the usual manner of using various files is so diverse that different techniques and apparatus are required to permit remote viewing under various circumstances. For example, a bank teller at a branch bank may wish to view the card containing a depositor's signature. In this case he needs to see but a single particular card and accordingly a completely automatic system for bringing the one desired card into view on a screen would be most suitable. As another example, a newspaper editor may wish to see all the pictures on file of a certain person so that he may select the proper picture to accompany a news item. This of course would require apparatus enabling him to browse through a number of cards.

The general approach to the problem involves presenting individual cards to the field of view of a television camera so that an image may be transmitted to a remote point. Regardless of whether the particular situation requires automatic selection of a single card or facilities to permit browsing, mechanical handling of the cards within each file drawer is required. Cards as filed in drawers or trays are usually subdivided by separator cards having tabs projecting above the main body of the pack. Card handling thus usually requires two processes, first, the selection of the group of cards behind a particular tab and the opening of the pack at that point, and second, the manipulation of the individual cards between tabs. The present invention is directed to apparatus for handling the individual cards between two adjacent tabs after the pack has been opened.

It is a general object of the present invention to provide apparatus for enabling an operator at a remote point to manipulate file cards so as to present various cards to the field of view of a television camera whereby an image of such cards can be viewed by the operator.

Another object is to provide apparatus for presenting each card in a pack between two tab separator cards to the field of view of a television camera.

Another object is to provide apparatus for turning the individual cards in an opened pack from a forward slanting position to a backward slanting position, and, if desired, back again.

Another object is to provide apparatus for remotely controlling the turning of individual cards in an opened pack.

Briefly stated, the invention is applied to a drawer of cards filed loosely enough to allow the pack to be broken open sufficiently so that the two groups of cards remain separated with a V-shaped space between them. The pack is broken open by means not here pertinent and a television camera is positioned to view the face card of the backward slanting pack. A vacuum orifice is reciprocated by an electric motor and goes through one cycle in response to closure of a switch by an operator at a remote point. Starting from a position above the cards at the center of the V, the orifice moves backward and downward to touch or nearly touch the first card, then reverses its motion, carrying the face card with it, passes through its starting position, and continues upward and forward. Soon after passing the starting position the orifice loses contact with the card which falls to the forward slanting position, whereupon the orifice is returned to its central starting position where it stops. By this arrangement the necessity for valves is eliminated and the vacuum source may be connected at all times. An analogous cycle is provided to allow a forward slanting card to be moved to the rearward slanting position.

For a clearer understanding of the invention reference may be made to the following detailed description and the accompanying drawing, in which.

Figure 1:
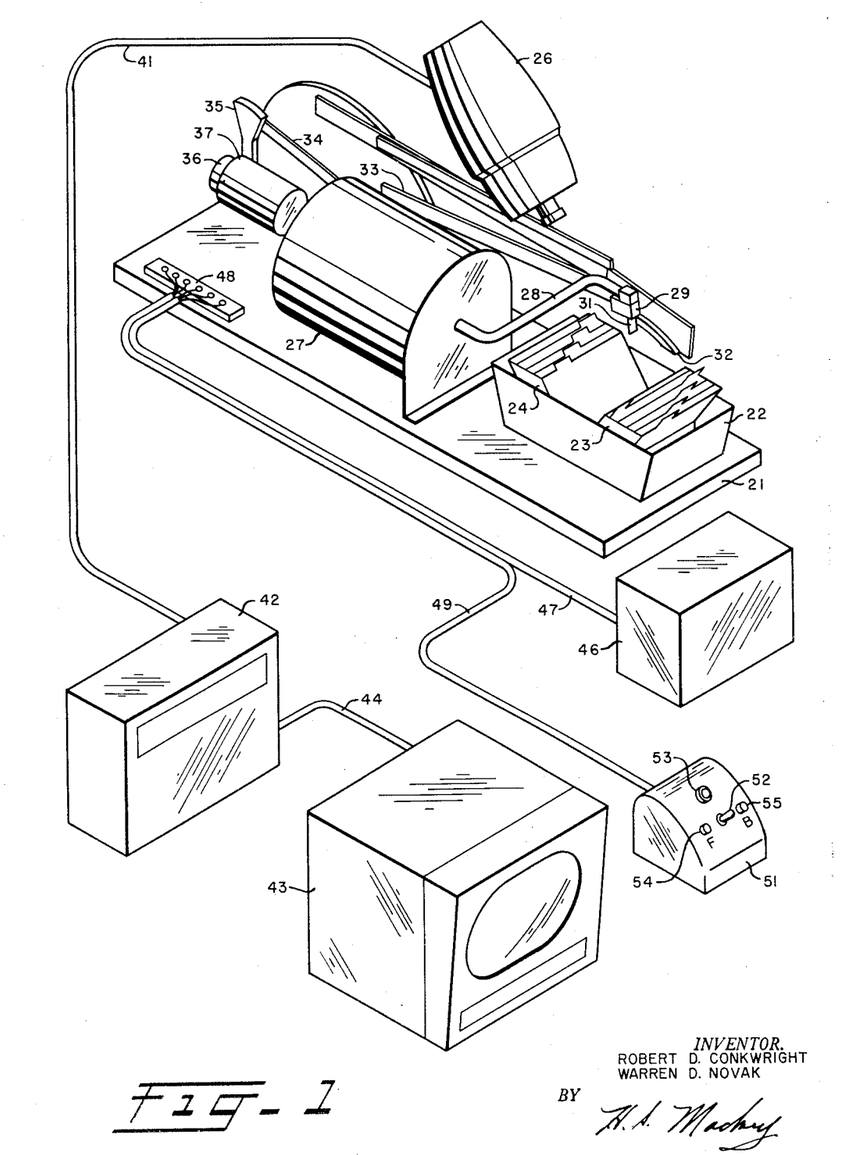
FIGURE 1 is an overall isometric view of the apparatus of the invention.

Referring first to FIG. 1, there is shown a base 21 for supporting the apparatus of the card handling mechanism. There is also shown a drawer 22 containing record cards arranged in two groups, one group 23 sloping toward the rear and the other group 24 sloping toward the front, each group having tab separator cards interspersed in the usual manner. Mounted above the drawer 22 by any suitable supporting means (not shown) is a television pickup camera 26 which is positioned and adjusted so as to view the face card of the backward sloping group of cards 23. A fan 27, only the housing of which appears, is mounted on the base 21 and has its air inlet connected by means of a flexible hose 28 to a block 29 which in turn connects to a tube 31 having an orifice in its end. The block 29 is mounted above the opening formed by the two groups of cards 23 and 24 and is arranged to be reciprocated along a track 32 by means of a mechanical linkage which includes bar 33, a bar 34, and a crank arm 35 driven by a right angle driven mechanism 36 which in turn is driven by an electric motor 37.

A cable 41 leads from the camera 26 to a camera control unit 42 which contains the necessary circuitry to generate suitable operating voltages for the camera 26. The camera control unit 42 also contains an amplifier which raises the level of the video signal from the camera 26 and the amplified signal is transmitted to a television monitor 43 by means of a cable 44.

A card control unit 46 comprising suitable relays, power supply circuits, etc., is connected by means of a cable 47 to a terminal block 48 mounted on the base 21. A cable 49 connects the terminal block to a control panel 51 which comprises a power switch 52, an indicator lamp 53, a "forward" push button switch 54 and a "backward" push button switch 55. The control panel 51 and the television monitor 43 may be located at a remote location while the base 21 and all the apparatus thereon is preferably located near the bank of file cards which it may be desired to view. The camera control unit 42 and the card control unit 46 may be placed at any convenient location.

The operation of the apparatus may now be somewhat sketchily described. The librarian or file clerk places the desired drawer of cards 22 on the base 21 and the pack of cards is opened at the desired point either manually or by suitable automatic apparatus which is not a part of the present invention. Upon being informed that the cards are in place and opened at the proper position the operator at the remote location turns on the power switch 52 which causes an image to appear on the screen of the monitor 43 and starts the fan 27 operating. The view on the screen is that of the face card of the backwardly sloping portion 23. To view the next card the operator pushes the forward button 54 whereupon the orifice moves backward into contact with the face card of the backward sloping portion, then moves forward bringing this card with it until it passes the vertical position at which point the orifice loses contact with the card which then falls to the forward sloping portion 24. Thus, the next card is exposed to the view of the camera 26. The operator may view this card as long as he may desire and when finished he may push the button again momentarily whereupon the cycle will be repeated. If the button 54 is held down, cards will be flipped rapidly and upon release of the button the apparatus will stop after the current cycle has been completed. If the operator wishes to take another look at a card which has already been viewed he may push the backward button 55 whereupon the orifice will pick up the face card of the forward sloping portion 24 and move it over to the backward sloping portion 23.

Figure 2:
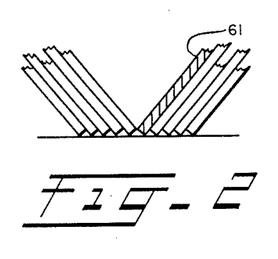
FIGURES 2 and 3 are diagrams useful in explaining the invention.
Figure 3:
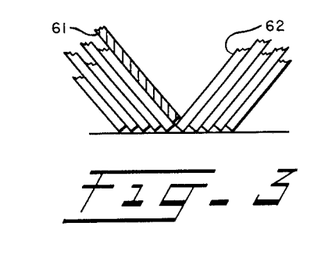

The turning of the cards from one portion to the other as above described is not as simple as it would at first appear because, as the cards are turned they tend to jam at the bottom. FIG. 2 represents a pack of cards divided into two portions, one of the cards 61 being crosshatched to distinguish it from the remaining cards. As this card is turned from the right-hand portion to the left it will assume some position such as is shown in FIG. 3 where it can be seen that the card 61 lies on top of the front card of the right-hand portion. Therefore, when the next card 62 is turned, it must raise the card 61. As successive cards are turned it sometimes happens that two or even three cards come to rest on top of the new face card and these must be raised in order to complete the turn. If the cards are turned by hand this is not a serious situation but when they are to be turned pneumatically, as in the present apparatus, this situation presents a problem. If the vacuum is too weak the orifice may not turn the card at all, while if it is made strong enough to turn the card in spite of the other cards lying on top of it, difficulty will be experienced in releasing the card at the proper time. Of course it would be possible to provide a system of valves to cut off the vacuum at the desired point but such systems greatly complicate the apparatus and are to be avoided if possible.

Figure 4:
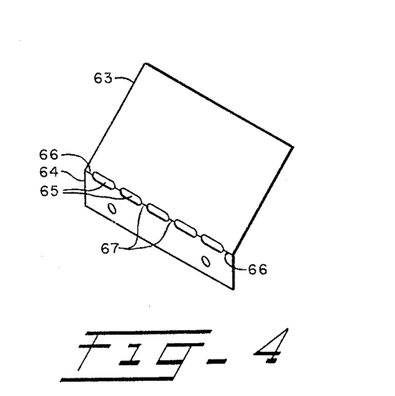
FIGURE 4 is an isometric view of a hinged card.
Figure 5:
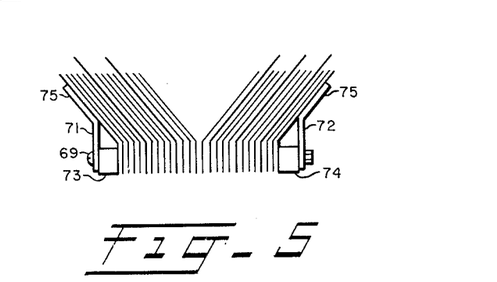
FIGURE 5 is an elevation view of a filing device for hinged cards.

A number of solutions are possible wtihout resorting to valves to start and stop the flow of air through the orifice, one being depicted in FIGS. 4 and 5. As shown in FIG. 4, the record card 63 is provided with a hinged tab 64 along the bottom edge. If, for example, the record card is to be of the standard 3" x 5" size, the card may be formed of 4" x 5" stock having perforations 65 arranged along a line approximately 1" from the lower edge as shown so that the portions of the card between perforations constitute hinges. These hinges must be strong enough to stand repeated bending yet weak enough so that, when the card is turned from one position to the other, there is no tendency for the card to return to its former position. In the case of a card 5" wide it has been found satisfactory to make the perforations of such size that two hinged portions 66 about ⅛" long at left at each end and four hinged portions 67 each about 1/16" long remain between the perforations. Cards so formed will lie perfectly flat after turning yet have been found capable of going through hundreds of thousands of bending cycles without exhibiting damaging fatigue.

FIG. 5 shows how a pack of cards as above described may be filed. It is assumed that each record card and each tab separator card is formed as shown in FIG. 4. The cards are all fastened together along the bottom hinged portion by means of bolts, one of which is shown at 69, which pass through two uprights 71 and 72 and two spacer blocks 73 and 74. The uprights include angled portions 75 and 76 which make an angle of approximately 40° to the vertical so that the included angle between the cards is approximately 80°.

Figure 6:
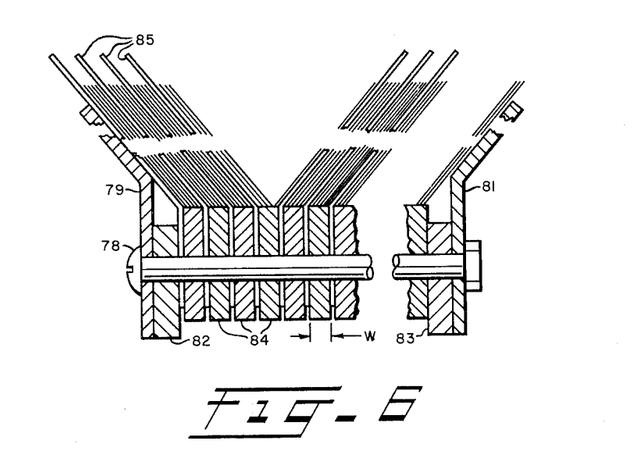
FIGURE 6 is a view, partly in section, showing apparatus for filing standard record cards between hinged tab separator cards.

Another solution to the problem is shown in FIG. 6. There is shown a bolt 78 which passes through two uprights 79 and 81 similar to those of FIG. 5 and also through two blocks 82 and 83. Between the blocks 82 and 83 are a plurality of spacers 84 and between these spacers are the hinged portions of tab separator cards 85 constructed as previously explained. Loose file cards (without any hinged tabs) are filed between the tab separator cards and rest on the top surface of the spacers 84. Each spacer 84 has a width $w$ exactly equal to the combined thickness of the record cards between adjacent tab card separators. In one embodiment it was found that spacers having a width approximately ⅛" were satisfactory for use with ten standard 3" x 5" cards. Of course, it is not necessary that all of the spacers 84 have the same width, but it is much more convenient to so construct the device. Since the tab separator cards are firmly held in position it is impossible for the file cards to slide very far and therefore the jamming of cards as depicted in FIGS. 2 and 3 is eliminated.

Figure 7:
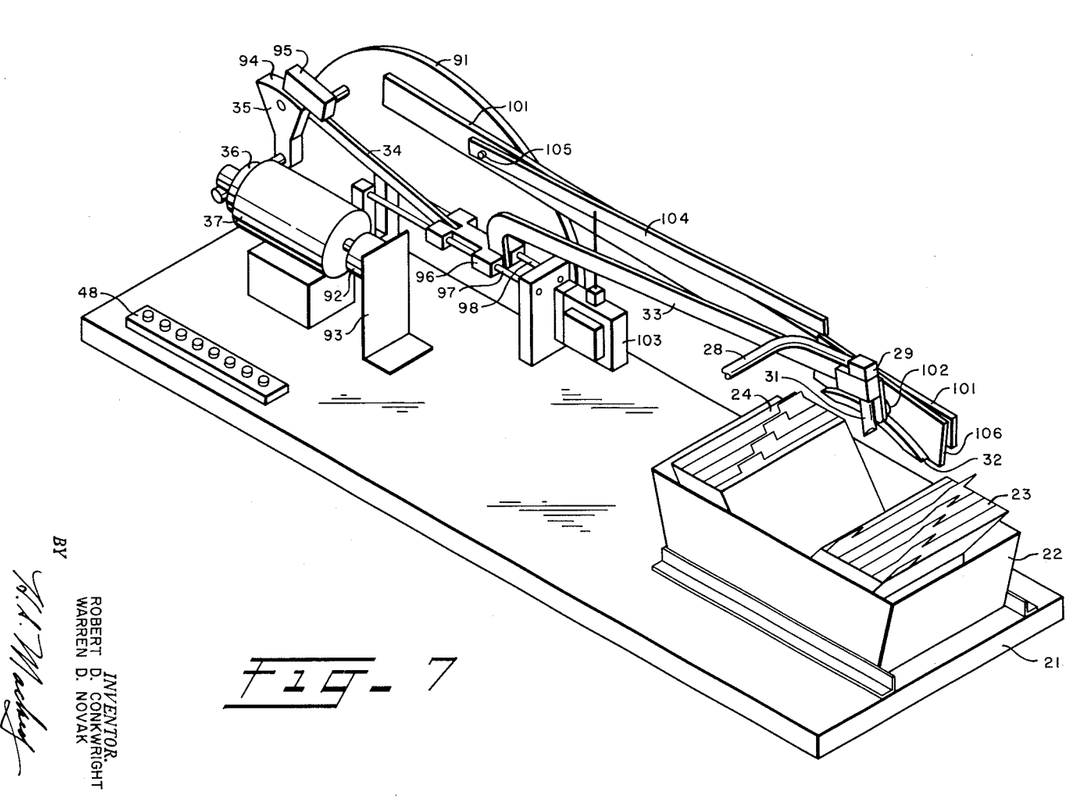
FIGURE 7 is an isometric view of the card handling mechanism.

Turning now to FIG. 7, the card handling mechanism is shown from the same angle as it is shown in FIG. 1. However, the fan housing has been omitted so that the remaining parts can be shown more clearly.

A rigid side member 91 is fastened securely to the base 21 and all of the parts are fastened to one or the other of these members. An electrically operated friction brake 92 is supported on a bracket 93 and is connected to the shaft of the motor 37. The gear reduction and right angle drive mechanism 36 rotates the crank arm 35 at a reduced speed. The arm 35 has a cam surface 94 which cooperates with a microswitch 95 which in turn is supported by the side member 91. As will be more fully explained, the brake 92 and the microswitch 95 cooperate to stop the motor and the parts driven thereby in the neutral position shown in the drawing.

The bar 34 is pivoted to the crank arm 35 and is also pivoted to a block 96 which slides on stationary rods 97 and 98. The bar 33 has one end pivoted to the block 96 and the other end rigidly fastened to the metal block 29 which supports the tube 31.

A rigid bar 101 is fastened to the side member 91 and extends approximately horizontally to a point above the card tray 22. The orifice track 32 is rigidly fastened to a frame member 106 which in turn is journaled to the bar 101 as will be more fully explained. The track 32 guides a roller 102 journaled on the end of the bar 33 so as to determine the paths of movement of the tube 31. The frame member 106 and the track 32 are normally held in the position shown by a spring (not shown in FIG. 7) but may be shifted about its pivot by the energization of a solenoid 103, the core of which is connected to a lever arm 104. One end of the lever arm 104 is pivoted at point 105 to the stationary bar 101 and its other end bears on the frame 106.

It is obvious from the drawing that when the crank arm 35 rotates through one revolution in the clockwise direction the tube 31 will move from its median position shown, first to the right, then back through its median position, then to a point to the left of the position shown and then back to the median position. If the crank arm is rotated one revolution counterclockwise, the tube 31 will move first to the left, then back to the median position, then to the extreme right, and then back to the median position.

Figure 8:
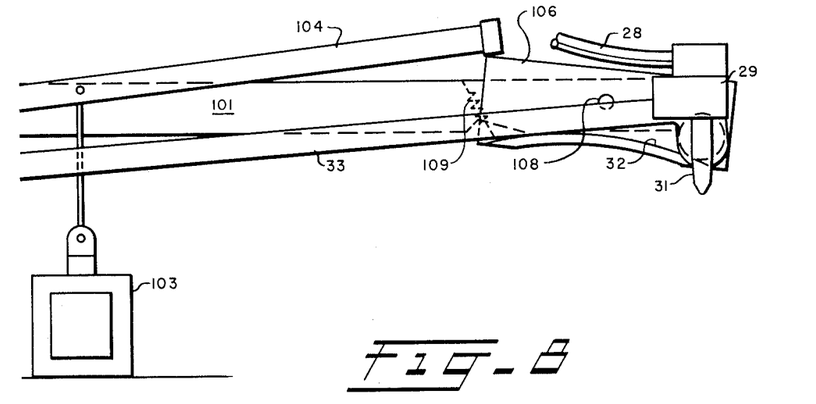
FIGURE 8 is a fragmentary elevation view showing the orifice track in one condition of operation.
Figure 9:
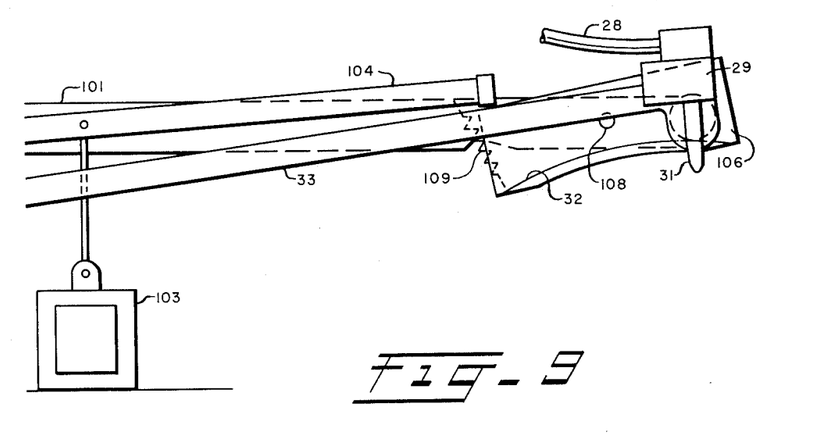
FIGURE 9 is a fragmentary elevation view showing the orifice track in another condition of operation.

FIG. 8 shows more clearly the mechanism for guiding the orifice along the desired paths. The track support frame 106 is pivoted at 108 to the stationary supporting bar 101. A spring 109 has one end fastened to the frame 106 and the other end to the bar 101 so as to hold the track 32 in the position shown with the right hand end of the track lower than the left hand end. When the solenoid 103 is energized the core pulls the lever 104 down, the right end of the lever 104 bears on the frame 106 and rotates at about pivot point 108 against the urging of the spring 109 to the position shown in FIG. 9 with the right hand end of the track 32 higher than the left hand end. The position of the track shown in FIG. 8 is for turning the face card of the backward slanting group of cards 23 (FIGS. 1 and 7) to the forward slanting position 24 while the position of the track 32 shown in FIG. 9 is for turning the face card of the backward slanting group of cards 24 to the forward slanting position.

Figure 10:
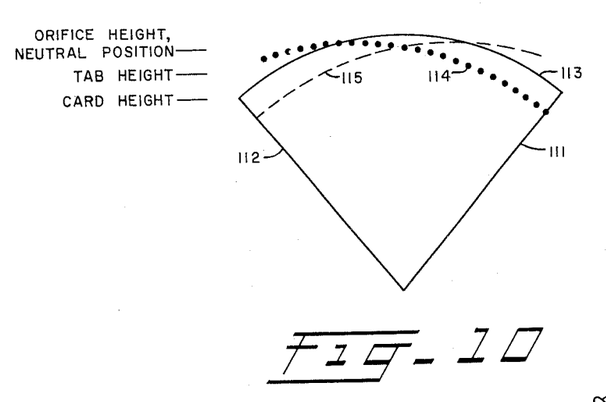
FIGURES 10, 11, 12, 13 and 14 are diagrams useful in explaining the invention.

FIG. 10 shows the face card 111 of the backward slanting group of cards and the face card 112 of the forward slanting group making an angle of about 80° with each other, which angle is suitable for enabling the camera 26 (FIG. 1) to view the card 111. When either card is turned about its lower edge as a pivot the top edge of the card will describe the curve shown by the solid line 113.

With the track 32 in the position shown in FIG. 8, the end of the pipe 31 will describe a curve 114 shown by the dotted line in FIG. 10. With the track 32 in the position shown in FIG. 9, the end of the pipe 31 will trace out the curve shown by the dashed line 115 in FIG. 10.

Figure 11:
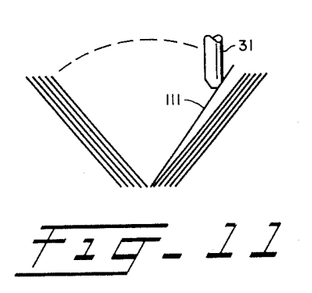
Figure 12:
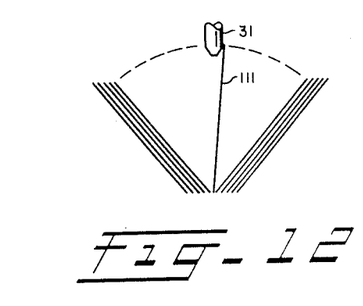
Figure 13:
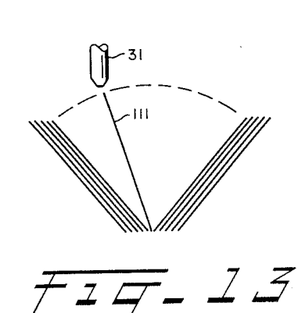
Figure 14:
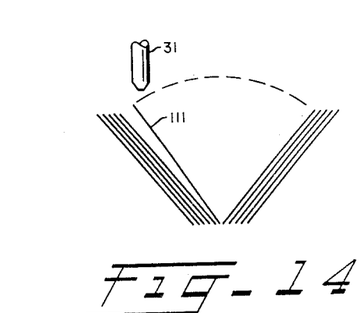

FIGS. 11–14 show diagrammatically how the card is turned from the backward slanting position to the forward slanting position. The orifice starts from the median position and then travels to the right to substantial contact with the face card 111 as shown in FIG. 11. Air drawn into the orifice flows along the surface of the card creating an area of reduced pressure on one surface. Therefore atmospheric pressure on the other surface of the card causes the card to press against the pipe 31. As the pipe moves to the center as shown in FIG. 12 the card will follow its movement and at this point is still in contact with the pipe 31. As the pipe moves further it loses contact with the card as shown in FIG. 13. Just as it loses contact air is drawn along both surfaces of the card 111 and the card will follow the pipe for a short time but will soon fall away as shown in FIG. 14 and join the group of forward slanting cards.

Returning to FIG. 10, it is noted that each of the paths 114 and 115 has one terminus in contact with the face of the card, then proceeds upward approaching the path of the top edge of the card and, soon after passing the median or dead center position, the path of the pipe crosses the path 113 of the top edge of the card. It would be possible to use straight paths or paths curving concave upward provided that one terminus were on the surface of the card and further provided that the path crossed the path 113 at or beyond the median or dead center position. Actually the crossing could be made before the dead center position since the card will follow the orifice for a short time after losing actual contact. However, an arcuate path concave downward crossing beyond dead center as illustrated is at present preferred.

Figures 15, 16, 17, 18:
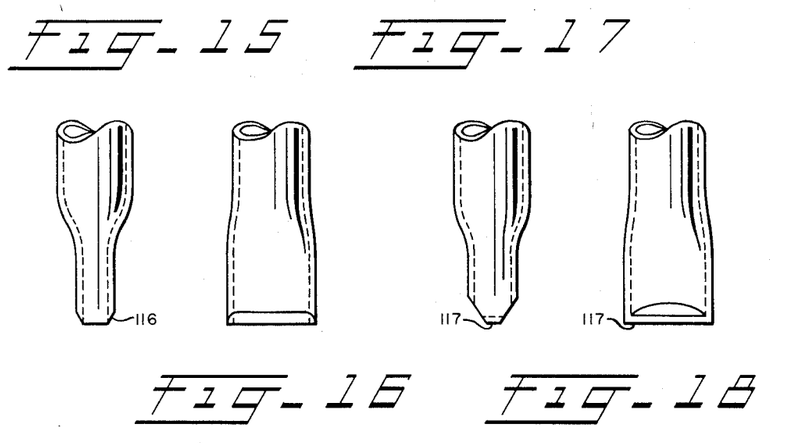
FIGURES 15 and 16 are elevation and side views respectively of one form of orifice.
FIGURES 17 and 18 are elevation and side views respectively of another form of orifice.

FIGS. 15 and 16 show one form of orifice which has been found satisfactory. The orifice is formed by squeezing one end of a hollow pipe so as to reduce one dimension and elongate the other. The wide dimension is cut on a slant as shown at 116 but not deep enough to penetrate the wall of the pipe thereby leaving an approximately planar oval shaped opening at the bottom. The pipe is placed in the block 29 so that the wide dimension engages the surface of the card.

FIGS. 17 and 18 illustrate another satisfactory orifice which is quite similar to that just described. However, the cut or bevel on the side is made deeper so that it penetrates the wall of the pipe and a small metal member 117 is added at the bottom across the longer dimension of the opening. The result of this construction is an orifice having two openings, one on each side.

Tests show that there is little to choose between the two orifices. As used both have the common important feature that the orifice is never completely blocked by the card. In the orifice of FIGS. 15 and 16, the opening is approximately planar but since the pipe 31 remains approximately vertical while the card varies in position through 40° on either side of the vertical, the opening is never closed by the card. In the embodiment of FIGS. 17 and 18 there are two openings separated by the thin strip 117 so that even if one of these openings is substantially closed the other remains open. In either case, air is drawn along the surface of the card into the tube creating a region of low pressure on the card surface.

Figure 19:
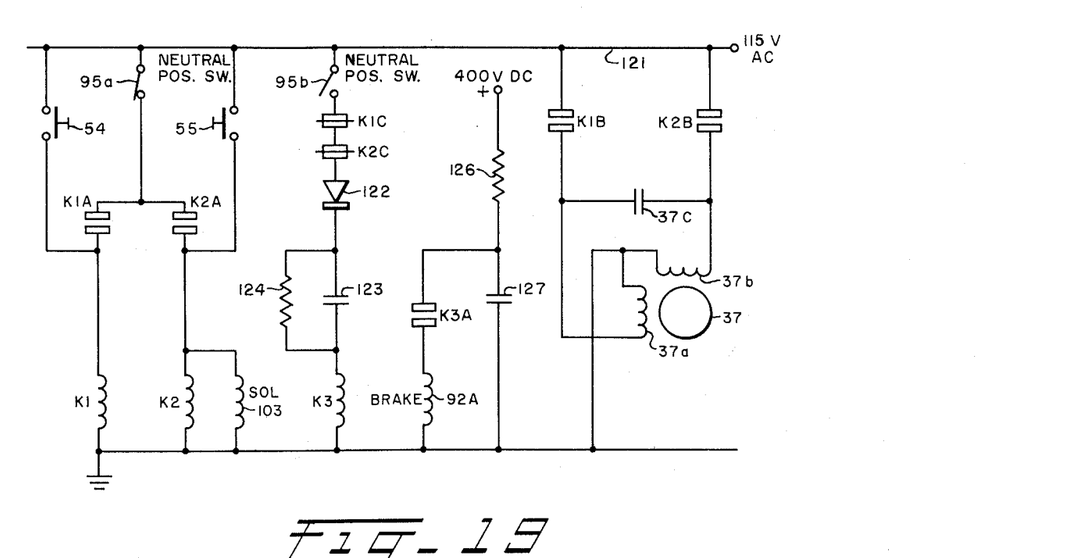
FIGURE 19 is a schematic wiring diagram.

FIG. 19 is a schematic wiring diagram of the apparatus. The push button switches 54 and 55 are physically located on the control panel 51 (FIG. 1). The neutral position switches 95a and 95b are elements of the microswitch 95 mounted on the side member 91 (FIG. 7); the solenoid 103 is mounted on the base 21 (FIG. 7); the motor 37 with its windings 37a and 37b and its capacitor 37c, as well as the brake 92 with its operating winding 92a are mounted on the base 21 (FIG. 7). All other components shown schematically in FIG. 19 may be mounted in the card control unit 46 (FIG. 1).

The switches 95a and 95b are shown in their unactuated position, that is, the position when the surface 94 of the crank arm 35 is disengaged from the switch actuator. At this time the switch 95a is closed while the switch 95b is open. When the switch is actuated as shown in FIG. 7 the conditions are reversed and the switch 95a is open while switch 95b is closed.

When the operator desires to move a card from the backward slanting position to the forward slanting position he depresses the push button switch 54 momentarily thereby completing a circuit from the power conductor 121 to the relay winding K1 thereby picking up the relay. When the relay K1 is picked up, the contact K1B is closed thereby connecting the power conductor 121 directly to the motor winding 37a and through the capacitor 37c to the winding 37b thereby causing the motor 37 to run in the forward direction. At the same time the normally open contact K1A is closed and, as soon as the surface 94 of the crank arm 35 (FIG. 7) becomes disengaged from the switch 95, the switch 95a will close thereby establishing an auxiliary circuit to the relay K1 so that it remains energized even though the push button 54 be released. The spring 109 (FIG. 8) holds the track 32 in such a position that the pipe 31 follows the path 114 (FIG. 10). When the apparatus returns to the neutral position, the switch 95a opens thereby deenergizing relay K1 and removing the power from the motor. At the same time switch 95b closes thereby allowing current to flow from the conductor 121 through the switch 95b, the normally closed contacts K1C and K2C, the rectifier 122 and a capacitor 123 to the relay winding K3. The capacitor 123 has been maintained in a discharged condition by a large shunting resistor 124 so that when switch 95b closes a surge of current from the conductor 121 charges the capacitor 123 and in so doing causes current to flow momentarily through relay winding K3. At the time during which the pipe 31 has been transferring the card, direct current from a 400 volt D.C. supply has been flowing through a large resistor 126 so as to charge a capacitor 127 fully. Energization of relay K3 closes the normally open contact K3A thereby allowing capacitor 127 to discharge through contact K3A and the operating winding 92a of the brake 92. This causes a large current to flow through the brake winding 92a for a very short period of time thus stopping the motor quickly. After capacitor 127 has discharged, the current through the winding 92a falls to a safe value as the resistor 126 limits the current which can flow from the D.C. supply. Additionally, the relay winding K3 remains energized but a short time since, as soon as capacitor 123 is charged, insufficient current can flow through resistor 124 to maintain the winding K3 energized and it soon drops out thereby opening contact K3A and removing all energization from the brake winding 92a.

When the operator wishes to turn a card from the backward slanting position to the forward slanting position he pushes the backward button 55 momentarily causing a similar sequence of events. Relay K2 is energized and is sealed in through its normally open contact K2A. Contact K2B closes thereby impressing line voltage directly on the winding 37b and energizing winding 37a through the capacitor 37c thereby causing the motor to rotate in the backward direction. At the same time that relay K2 is energized the solenoid 103 connected in parallel therewith is energized which shifts the position of the track 32 to that position shown in FIG. 9. Pipe 31 travels along the path shown by the curve 115 of FIG. 10 from the median position first to the left so as to make contact with card 112 then back through the median position to its upper limit during which time the card is released and then back to the median position. Relay winding K3 is energized by the closure of switch 95b as before therefore applying the brake to the motor. Also as before, the switch 95a opens thereby deenergizing the relay K2, the solenoid 103 and the motor 37.

It is noted that the line from the conductor 121 to the relay winding K3 includes the two normally closed contacts K1C and K2C so that this line is open any time either one of these relays is energized. Therefore, if either of buttons 54 or 55 be held down continuously by the operator, the motor will rotate without interruption since the brake cannot be applied as long as either relay K1 or relay K2 is energized. This permits the operator to turn one card after another very rapidly from one position to the other.

It is apparent from the foregoing description that the present invention provides a simple and convenient apparatus for selecting and viewing file cards from a remote location. It is only necessary for the librarian to open the pack at the designated tab and slide the file drawer into the apparatus. The drawer may be slid into place readily since, at the neutral position, the orifice is well above the height of the tabs of the separator cards, as shown in FIG. 10. Control may then be turned over to the operator at the remote location.

Standard file cards stored as herein described each occupy a space of only about 0.010 inch so that it is possible to turn over and view ten or fifteen cards without shifting the position of the drawer. However, if many cards are turned without adjusting the position of the drawer, the orifice will no longer be in the optimum position and additionally the camera will gradually lose focus. Therefore, if there are a great many cards between separators, it would be desirable to provide some sort of "inching" arrangement to adjust the position of the drawer as each card is turned. However, as above mentioned, this is unnecessary when there are only a few cards between separators.

Although the invention has been described in connection with a specific embodiment it will be understood that many modifications will occur to those skilled in the art. It is therefore desired that the invention be limited only by the true scope of the appended claims.

What is claimed is:

1. Apparatus for selecting and viewing images of a plurality of cards comprising, a television camera, card handling means for placing various cards in the field of view of said camera, means including said camera for forming a visual image at a remote location of objects within the field of view of said camera, and means for controlling said card handling means from said remote location.

2. Apparatus for selecting and viewing images of a plurality of cards stored in a container, comprising, a television camera positioned to view cards in the container, card handling means for manipulating the cards while in the container so as to place various cards in the field of view of said camera, means including said camera for forming a visual image at a remote location of objects within the field of view of said camera, and means for controlling said card handling means from said remote location.

3. Apparatus for selecting and viewing images of cards stored on edge loosely enough so that the cards can remain separated into two portions the first portion sloping forward and the second portion sloping backward, comprising, a television camera positioned to include within its field of view the top card of the backward sloping portion, card handling means for successively placing various cards in the field of view of said camera, means including said camera for forming a visual image at a remote location of objects within the field of view of said camera, and means for controlling said card handling means from said remote location.

4. Apparatus for selecting and viewing images of cards stored on edge loosely enough so that the cards can remain separated into two portions the first portion sloping forward and the second portion sloping backward, comprising, a television camera positioned to include within its field of view the top card of the backward sloping portion, means for selectively turning either the top card of the backward sloping portion to the forward sloping position or for turning the top card of the forward sloping portion to the backward sloping position, means including said camera for forming a visual image at a remote location of objects within the field of view of said camera, and means for controlling said selective turning means from said remote location.

5. Apparatus for selecting and viewing images of cards stored in a file drawer tightly enough so that they remain in a semi-upright position yet loosely enough so that they can remain separated into two portions one sloping forward and the other sloping backward, comprising, a television camera positioned to view the top card of the backward sloping portion, pneumatic means for turning the cards of either portion one at a time to the other portion, means including said camera for forming a visual image at a remote location of objects within the field of view of said camera, and means for controlling said pneumatic means from said remote location.

6. An actuating device for cards stored on edge loosely enough so that the cards can remain in two groups one sloping forward and the other sloping backward whereby when the top card of either group is pivoted about its lower edge so as to join the other group its upper edge defines a first path, comprising, a tube having an opening in one end, means for drawing air through said one end into said tube, and means for moving said end of said tube selectively along either a second path or a third path, said second path having one end on the surface of the top card of the backward sloping group and crossing said first path and said third path having one end on the surface of the top card of the forward sloping group and crossing said first path.

7. An actuating device for cards stored on edge loosely enough so that the cards can remain in two groups one sloping forward and the other sloping backward whereby when the top card of either group is pivoted about its lower edge so as to join the other group its upper edge defines a card extremity path, comprising, a tube having an opening in one end defining an orifice, means for drawing air through said orifice into said tube, a track for guiding a portion of said tube so as to define paths of movement of said one end of said tube, means for shifting the position of said track so as to define either a first or a second path for said end of said tube, said first tube end path having one terminus on the surface of the top card of the backward sloping group and crossing said card extremity path, said second tube path having one terminus on the surface of the top card of the forward sloping group and crossing said card extremity path, means for selectively moving said portion of said tube either from the midpoint of said track to the first end of said track, thence to the second end of said track, and then back to said midpoint, or from said midpoint of said track to second end of said track, thence to said first end of said track and then back to said midpoint, and means for interconnecting said track shifting means and said selective moving means so that one of the above mentioned movements of said portion of said tube always occurs with said track in one position while the other of the above mentioned movements always occurs with said track in its other position.

8. An actuator for transporting a sheet of material comprising, a tube including an opening in one end defining an orifice, means for drawing air through said orifice into said tube, and means for first positioning said end of said tube adjacent to one surface of a sheet of material to be transported without completely blocking said opening, whereby air is drawn along said surface creating an area of reduced pressure thereby drawing said sheet into contact with said tube, and for next moving said tube away from the initial plane of said sheet whereby atmospheric pressure on the other surface of said sheet causes said sheet to follow the movement of said tube.

9. An actuator for transporting a sheet of material comprising, a tube having an opening in one end defining an orifice, the portion of said tube immediately surrounding said orifice constituting a boundary region, means for drawing air through said orifice into said tube, and means for first positioning said end of said tube adjacent to one surface of a sheet of material to be transported with one portion of said boundary region nearer to said surface than the remainder of said boundary portion, whereby air is drawn along said surface creating an area of reduced pressure thereby drawing said sheet into contact with said one portion of said boundary region, and for next moving said end of said tube away from the initial plane of said sheet whereby atmospheric pressure on the other surface of said sheet causes said sheet to follow the movement of said end of said tube.

10. Card turning apparatus for turning file cards in a file drawer from a backward sloping position to a forward sloping position or vice versa comprising, a tube having an opening in one end defining an orifice, the portion of said tube immediately surrounding said orifice constituting a boundary region, means for drawing air through said orifice into said tube, means for supporting said end of said tube above said cards in a median position in the space between the forward and backward sloping cards, and means for moving said end of said tube through either of two selected cycles of movement, the first cycle carrying said end of said tube from its median position to a point adjacent to the surface of the top card of the backward sloping cards with one portion of said boundary region nearer said surface than the remaining portion of said boundary region, then carrying said end of said tube upward and toward the forward sloping cards through said median position to a point above the arc made by a card in being turned from one to the other sloping position, the second cycle carrying said end of said tube from its median position to a point adjacent to the surface of the top card of the forward sloping cards with one portion of said boundary region nearer to said surface than the remaining portion of said boundary region, then carrying said end of said tube upward and toward the backward sloping cards through said median position to a point above said arc.

11. Apparatus for bringing each of a plurality of records into view one at a time comprising, a plurality of cards each bearing a record on its surface, each card including a tab hinged to its bottom edge, first and second sloping end supports fastened to each other and sloping upward and away from each other, means for fastening all of said tabs together and to said end supports with the tabs approximately vertical, whereby said cards may be divided at any point into a forwardly sloping group of cards and a backwardly sloping group of cards, the top edge of a card when swung about its hinge from one group to the other describing an arc, a tube having an opening in one end defining an orifice, means for drawing air through said orifice into said tube, and means for moving said end of said tube first into contact with the surface of the top card of one group and then toward the other group and upward to a point above said arc.

12. Apparatus for bringing each of a plurality of records into view one at a time comprising, a plurality of cards each having a record on its surface, said cards being fastened together at one edge and arranged like the pages of a book having its binding supported on a substantially horizontal surface and both covers partly open, whereby each card may be swung between a forward sloping position and a backward sloping position during which swing the top edge of the card defines an arc, a tube having an opening in one end defining an orifice, means for drawing air through said orifice into said tube, means for supporting said tube with the orifice in a median position above said cards and between the forward and backward sloping positions, and means for moving said tube through either of two selected cycles of movement, the first cycle carrying said orifice from the median position into contact with the surface of the top card on the forward sloping position, back through said median position to a point above said arc, and then returning to the median position, and the second cycle carrying said orifice from the median position into contact with the surface of the top card of the backward sloping position, back through said median position to a point above said arc, and then returning to the median position.

13. Apparatus for bringing a plurality of records into view one at a time comprising, a plurality of record cards, a plurality of tab separator cards interspersed among said record cards to divide said record cards into groups, each tab separator card being formed with a hinged tab on the bottom, a plurality of spacer blocks arranged between the hinged tabs of said separator cards, the width of each block being equal to the combined thickness of the record cards between tab separator cards, means for fastening all of said blocks and hinged tabs together with the hinged tabs approximately vertical and the hinges at the same level as the tops of said blocks, whereby said record cards may be supported loosely by said blocks, a pair of upstanding end supports fastened to said blocks and sloping away from each other, whereby the pack of cards can be broken at any point into two portions, one portion sloping forward and the other portion sloping backward, a tube having an opening in one end defining an orifice, means for drawing air through said orifice into said tube, and means for first moving said end of said tube into contact with the surface of the top card in one portion and then moving said end of said tube upward and toward the other portion to a point above the arc described by the upper edge of a card while being turned from one portion to the other portion.

14. Apparatus for bringing a plurality of records into view one at a time comprising, a plurality of record cards, a plurality of tab separator cards interspersed among said record cards to divide said record cards into groups, each tab separator card being formed with a hinged tab at the bottom, a plurality of spacer blocks arranged between the hinged tabs of said separator cards, the width of each block being equal to the combined thickness of the record cards between tab separator cards, means for fastening all of said blocks and hinged tabs together with the hinged tabs approximately vertical and the hinges at the same level as the top surfaces of said blocks whereby said record cards may be supported loosely by said blocks, a pair of upstanding end supports fastened to said blocks and sloping away from each other, whereby the pack of cards can be broken at any point into two portions, one portion sloping forward and the other portion sloping backward, the top edge of a card when swung about its lower edge from one portion to the other describing an arc, a tube having an opening in one end defining an orifice, means for drawing air through said orifice into said tube, and means for moving said end of said tube including said orifice along a path which intersects said arc.

15. A selective card viewing apparatus for cards stored on edge loosely enough so that the cards can remain in two portions, one portion sloping forward and the other sloping backward whereby when the top card of either group is turned about its lower edge as an axis so as to join the other group the upper edge describes an arc, comprising, a television camera for viewing the top card of the backward sloping portion, a tube having an opening in one end defining an orifice, means for mounting said tube in a median position above said cards between the two sloping portions, means for drawing air through said orifice into said tube, actuating means for selectively moving said orifice through either of two cycles, the first cycle carrying said orifice from the median position into contact with the surface of the top card of the backward sloping portion, then upward and toward the forward sloping cards through the median position to a point above said arc and back to the median position, the second cycle carrying said orifice from the median position into contact with the surface of the top card of the forward sloping portion, then upward and toward the backward sloping cards through the median position to a point above said arc and back to the median position, means including said camera for forming a visual image at a remote location of objects within its field of view, and means at said remote location for controlling said actuating means.

References Cited in the file of this patent

UNITED STATES PATENTS

| | | |
|---|---|---|
| 2,334,751 | Chapman | Nov. 23, 1943 |
| 2,448,830 | Robbins | Sept. 7, 1948 |
| 2,574,013 | Boyd | Nov. 6, 1951 |
| 2,656,629 | Romaniuk | Oct. 27, 1953 |
| 2,895,005 | Kock | July 14, 1959 |
| 2,914,746 | James | Nov. 24, 1959 |

OTHER REFERENCES

"Industrial Television," Electronic Engineering, September 1948, pages 294 and 295. (Copy available in U.S. Patent Office.)

"Industrial T.V.," Radio and Television News, October 1955, pages 37 to 40. (Copy available in U.S. Patent Office.)